US009097870B2

(12) United States Patent
Torman et al.

(10) Patent No.: US 9,097,870 B2
(45) Date of Patent: Aug. 4, 2015

(54) RAPID MULTI-SERVICE TERMINAL

(75) Inventors: Nicholas Torman, Minneapolis, MN (US); Oscar Fernando Bran De Leon, Belle Plaine, MN (US); Trevor D. Smith, Eden Prairie, MN (US); Thomas Marcouiller, Shakopee, MN (US); Thomas G. Leblanc, Westminster, MA (US)

(73) Assignee: ADC Telecommunications, Inc., Berwyn, PA (US)

( * ) Notice: Subject to any disclaimer, the term of this patent is extended or adjusted under 35 U.S.C. 154(b) by 325 days.

(21) Appl. No.: 13/698,752

(22) PCT Filed: May 19, 2011

(86) PCT No.: PCT/US2011/037162
§ 371 (c)(1),
(2), (4) Date: Mar. 13, 2013

(87) PCT Pub. No.: WO2011/146722
PCT Pub. Date: Nov. 24, 2011

(65) Prior Publication Data
US 2013/0195417 A1 Aug. 1, 2013

Related U.S. Application Data

(60) Provisional application No. 61/346,415, filed on May 19, 2010.

(51) Int. Cl.
*G02B 6/00* (2006.01)
*G02B 6/36* (2006.01)
(Continued)

(52) U.S. Cl.
CPC .............. *G02B 6/444* (2013.01); *G02B 6/3897* (2013.01); *G02B 6/4457* (2013.01); *G02B 6/46* (2013.01); *B65H 75/14* (2013.01); *Y10T 29/49826* (2013.01)

(58) Field of Classification Search
CPC .... G02B 6/3897; G02B 6/444; G02B 6/4453; G02B 6/4457; G02B 6/46; B65H 75/14
USPC ................ 385/53, 134–139; 29/428; 242/603
See application file for complete search history.

(56) References Cited

U.S. PATENT DOCUMENTS

| 7,090,406 B2 | 8/2006 | Melton et al. |
| 7,477,824 B2 | 1/2009 | Reagan et al. |

(Continued)

OTHER PUBLICATIONS

International Search Report for International Application No. PCT/US2011/037162 mailed Feb. 9, 2011.

*Primary Examiner* — Akm Enayet Ullah
*Assistant Examiner* — Michael Mooney
(74) *Attorney, Agent, or Firm* — Merchant & Gould P.C.

(57) ABSTRACT

A method for installing a drop terminal includes providing a drop terminal assembly including a drop terminal having an exterior surface, a first cable spool engaged to the exterior surface of the drop terminal, a second cable spool engaged to the first cable spool and a fiber optic cable having a first length disposed about the first cable spool and a second length disposed about the second cable spool. The drop terminal assembly is rotated to deploy the second length of fiber optic cable. The second cable spool is removed. The first length of fiber optic cable is bundled. The bundled first length of fiber optic cable is removed from the first cable spool. The drop terminal is removed from the first cable spool. The drop terminal is mounted to a structure.

4 Claims, 9 Drawing Sheets

(51) Int. Cl.
*B65H 75/14* (2006.01)
*G02B 6/44* (2006.01)
*G02B 6/38* (2006.01)
*G02B 6/46* (2006.01)

(56) References Cited

U.S. PATENT DOCUMENTS

| | | |
|---|---|---|
| 7,720,343 B2 | 5/2010 | Barth et al. |
| 2006/0153517 A1 | 7/2006 | Reagan et al. |
| 2009/0317047 A1 | 12/2009 | Smith et al. |

RAPID MULTI-SERVICE TERMINAL

This application is being filed on 19 Nov. 2012, as a US National Stage of PCT International Patent application No. PCT/US2011/037162, filed 19 May 2011 in the name of ADC Telecommunications, Inc., a U.S. national corporation, applicant for the designation of all countries except the U.S., and Nicholas Torman, a citizen of the U.S., Oscar Fernando Bran de Leon, a citizen of the U.S., Trevor D. Smith, a citizen of the U.S., Thomas Marcouiller, a citizen of the U.S., and Thomas G. LeBlanc, a citizen of the U.S., applicants for the designation of the U.S. only, and claims priority to which claims the benefit of U.S. Patent Application Ser. No. 61/346,415 filed on 19 May 2010. PCT/US2011/037162 and U.S. Ser. No. 61/346,415 are incorporated herein by reference. To the extent appropriate, a claim of priority is made to each of the above disclosed applications.

SUMMARY

An aspect of the present disclosure relates to a method for installing a drop terminal. The method includes providing a drop terminal assembly including a drop terminal having an exterior surface, a first cable spool engaged to the exterior surface of the drop terminal, a second cable spool engaged to the first cable spool and a fiber optic cable having a first length disposed about the first cable spool and a second length disposed about the second cable spool. The drop terminal assembly is rotated to deploy the second length of fiber optic cable. The second cable spool is removed. The first length of fiber optic cable is bundled. The bundled first length of fiber optic cable is removed from the first cable spool. The drop terminal is removed from the first cable spool. The drop terminal is mounted to a structure.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
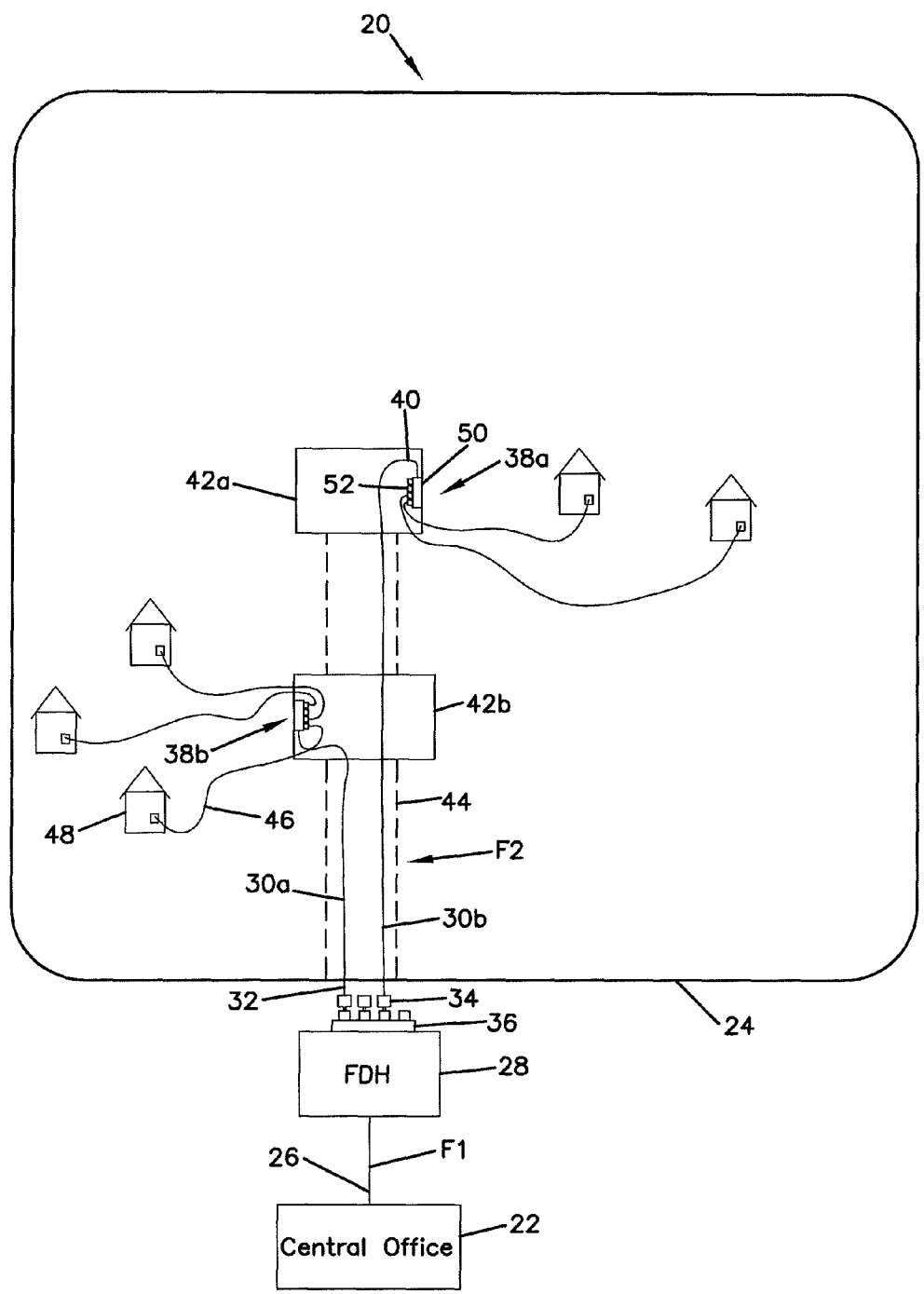
FIG. 1 is a schematic representation of a fiber optic network.

Referring now to FIG. 1, a passive fiber optic distribution network 20 is shown. Generally, the fiber optic distribution network 20 is adapted for transmitting fiber optic telecommunication services between a central office 22 and a local area 24 (e.g., a local loop). The distribution network includes an F1 distribution cable 26 that preferably includes a plurality of optical fibers. For example, in one embodiment, the F1 distribution cable 26 may have on the order of 12 to 48 fibers. However, alternative numbers of fibers may also be used. One or more of the optical fibers of the F1 distribution cable 26 are routed to a fiber distribution hub 28. An exemplary fiber distribution hub has been described in U.S. Pat. No. 7,720,343, which is hereby incorporated by reference in its entirety. The fiber distribution hub 28 preferably includes one or more passive optical splitters adapted to split signals carried by the fibers of the F1 distribution cable 26 into a plurality of fibers that are optically coupled to one or more F2 distribution cables 30a-b routed from the distribution hub 28 into the local area 24. In one embodiment, the F2 distribution cables 30a-b can each include 12 optical fibers.

As shown at FIG. 1, the F2 distribution cables 30a-b include first ends 32 terminated by ruggedized multi-fiber connectors 34. The multi-fiber connectors 34 interface with a bank 36 of fiber optic adapters provided at an exterior of the fiber distribution hub 28. The adapter bank 36 facilitates quickly providing an optical connection between the optical fibers within the fiber distribution hub 28 and the optical fibers of the F2 distribution cables 30a-b. Fiber optic drop terminals 38a-b are respectively located at second ends 40 of the F2 distribution cables 30a-b. A first drop terminal 38a is shown positioned within a first hand hole 42a. A second drop terminal 38b is shown mounted within a second hand hole 42b. The F2 distribution cables 30a-b are shown routed through an underground conduit 44 that is shown interconnecting the first and second hand holes 42a, 42b. Referring still to FIG. 1, fiber optic drop cables 46 are routed from the drop terminals 38a-b to ONT's located at subscriber locations 48.

Each of the drop terminals 38a-b includes a housing 50. A plurality of ruggedized fiber optic adapters 52 are mounted to each of the housings 50. It will be understood that the term "ruggedized" refers to a component or system that is capable of withstanding the elements of an outdoor environment and that reduces the risk of or prevents the ingress of dirt, dust, water, etc. from entering the drop terminal 38. The ruggedized fiber optic adapters 52 include first ports that are accessible from outside the housings 50 and second ports that are accessible from inside the housings 50. The fibers of the F2 distribution cables 30a-b are terminated by optical connectors that are inserted into the second ports of the ruggedized fiber optic adapters 52. In certain embodiments, the optical connectors can be terminated directly on the ends of the fibers of the F2 distribution cables 30a-b. In alternative embodiments, the optical connectors can be terminated indirectly to the ends of the optical fibers of the F2 distribution cables 30a-b through the use of connectorized pigtails that are spliced to the ends of the fibers of the F2 distribution cables 30a-b.

The drop cables 46 can be terminated at each end by a ruggedized optical connector. An example ruggedized optical connector is disclosed at U.S. Pat. No. 7,090,406 that is hereby incorporated by reference. The ruggedized optical connector terminated at one end of a given drop cable can be inserted into the first port of one of the drop terminals 38a-b, while the ruggedized optical connector located at the opposite end of the drop cable can be inserted into a corresponding ruggedized adapter provided at the ONT located at the subscriber location 48. In the subject embodiment, the ruggedized optical connector includes a sealing member that engages a sealing surface of the ruggedized fiber optic adapter to provide an environmental seal or a weatherproof seal between the ruggedized optical connector and the ruggedized adapter 52.

Figure 2:
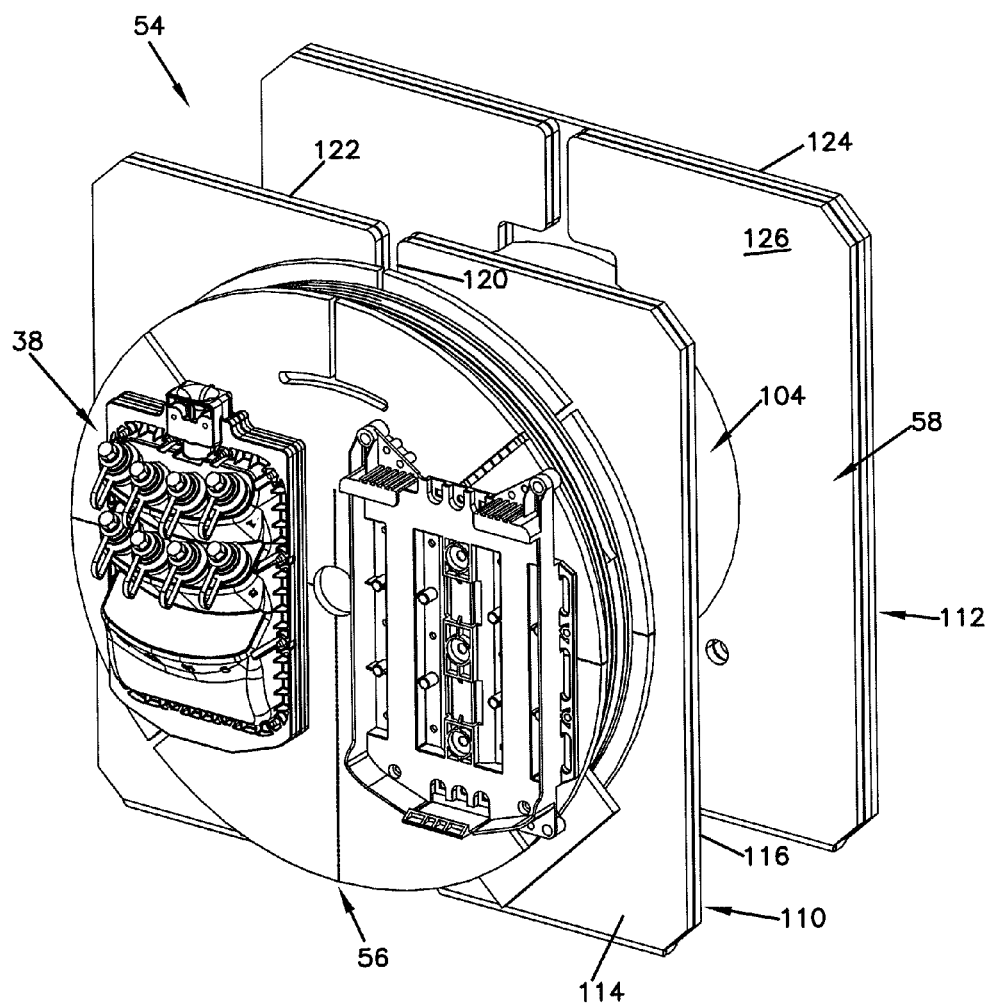
FIG. 2 is an isometric view of a drop terminal assembly having exemplary features of aspects in accordance with the principles of the present disclosure.
Figure 3:
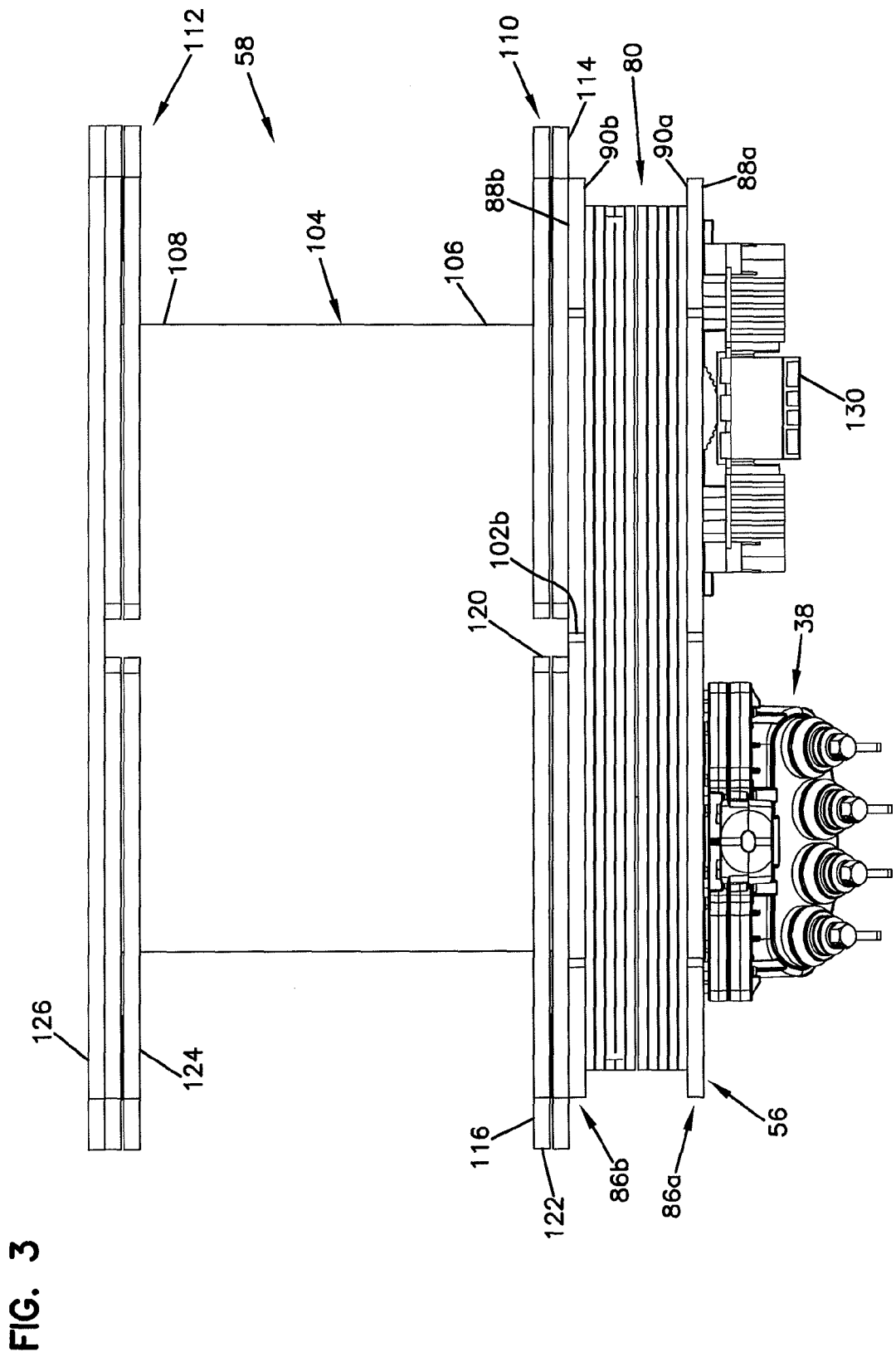
FIG. 3 is a side view of the drop terminal assembly of FIG. 2.

Referring now to FIGS. 2 and 3, a drop terminal assembly 54 is shown. The drop terminal assembly 54 includes the drop terminal 38, a first cable spool 56 engaged to an exterior surface of the drop terminal so that the drop terminal 38 and the first cable spool 56 rotate in unison and a second cable spool 58 engaged to the first cable spool 56 so that the second cable spool 58 and the first cable spool 56 rotate in unison.

Figure 4:
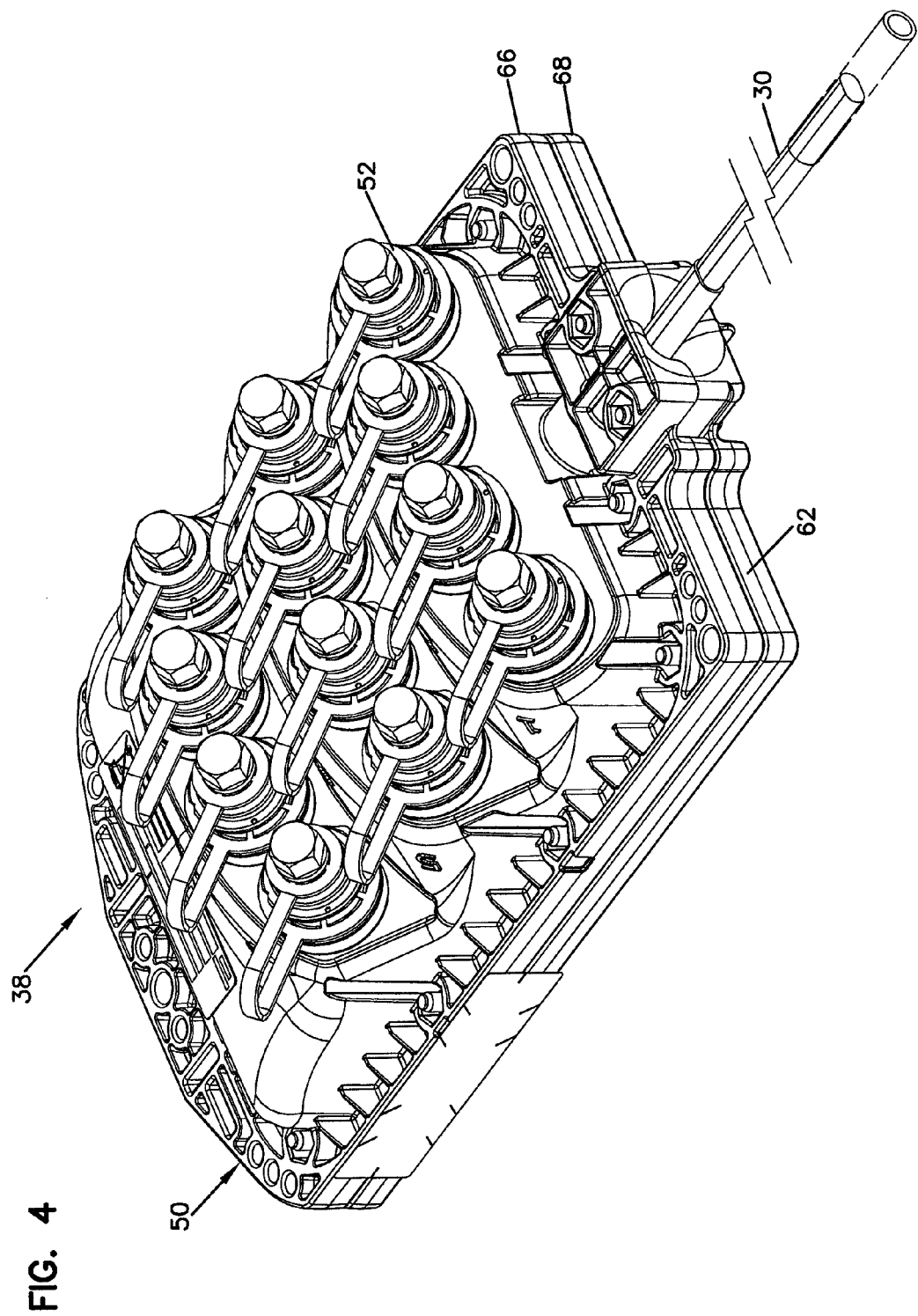
FIG. 4 is an isometric view of a drop terminal of the drop terminal assembly of FIG. 2.
Figure 5:
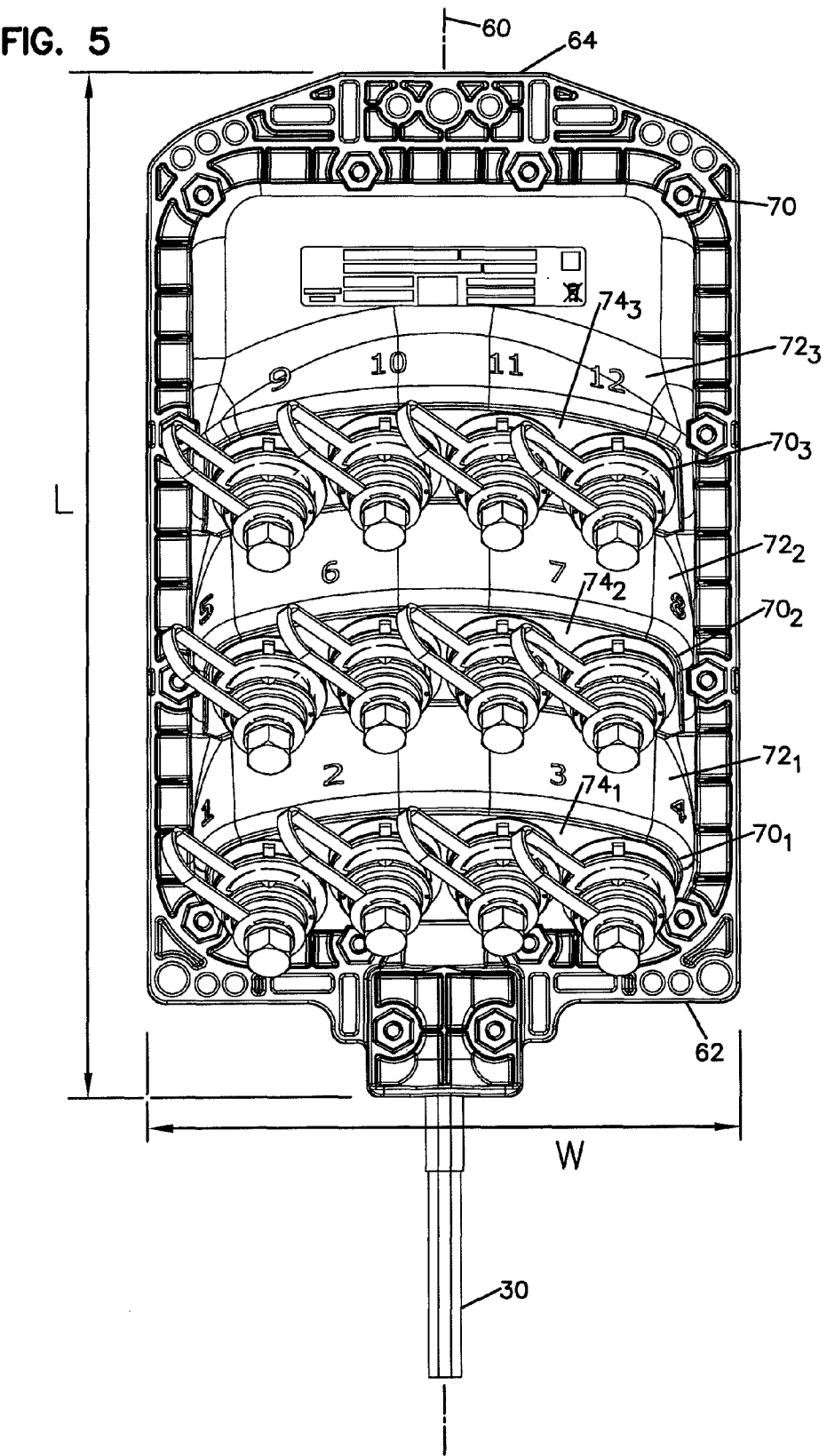
FIG. 5 is a front view of the drop terminal of FIG. 4.
Figure 6:
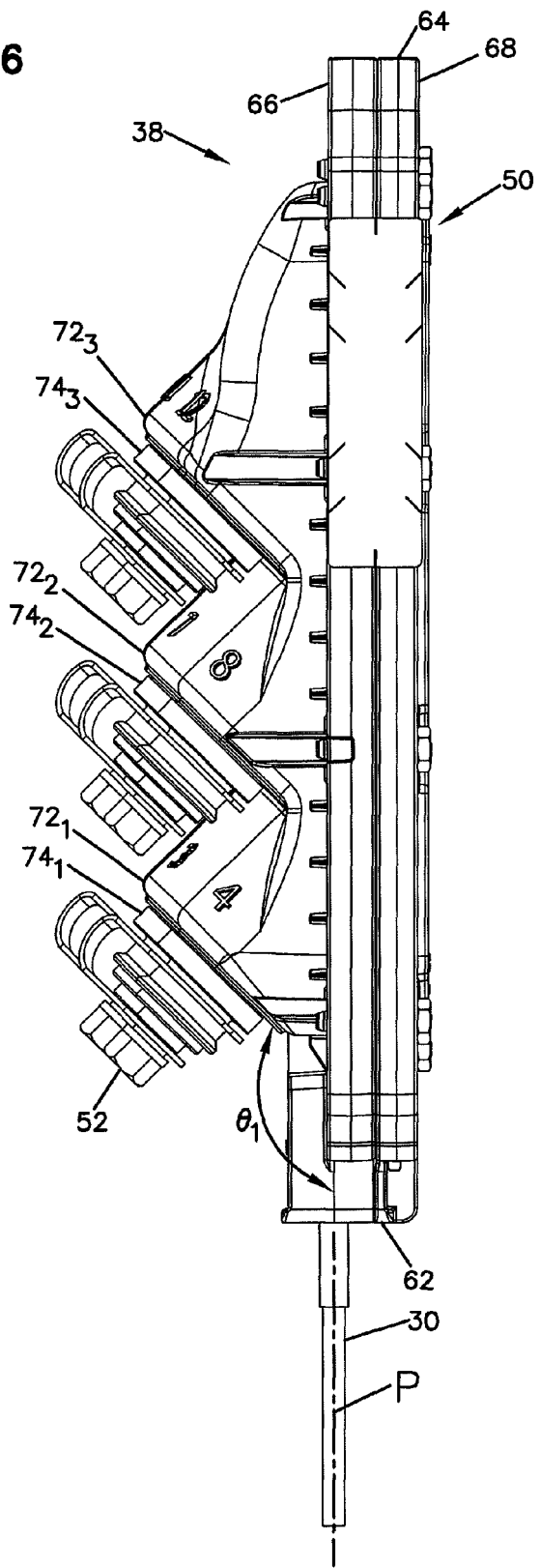
FIG. 6 is a side view of the drop terminal of FIG. 4.

Referring now to FIGS. 4-6, the drop terminal 38 is shown. The drop terminal 38 shown in FIG. 4-6 has been described in U.S. Pat. No. 7,512,304, the disclosure of which is hereby incorporated by reference in its entirety.

The housing 50 of the drop terminal 38 includes a central longitudinal axis 60 that extends from a first end 62 to a second end 64 of the housing 50. The housing 50 includes a front piece 66 and a back piece 68 that cooperate to define an enclosed interior of the housing 50. The front and back pieces 66, 68 are joined by fasteners 70 (e.g., bolts or other fastening elements) spaced about a periphery of the housing 50. The front and back pieces 66, 68 are elongated along the central axis 60 so as to extend generally from the first end 62 to the second end 64 of the housing 50.

The drop terminal 38 is environmentally sealed. In the subject embodiment, the drop terminal 38 includes a gasket mounted between the front and back pieces 66, 68 of the housing 50. The gasket extends around the perimeter or periphery of the housing 50 and prevents moisture from entering the enclosed interior of the assembled housing 50.

The housing 50 of the drop terminal 38 also includes the plurality of ruggedized fiber optic adapters 52 mounted to the front piece 66 of the housing 50. Each of the ruggedized fiber optic adapters 52 includes the first port accessible from outside the housing 50 and the second port accessible from within the housing 50.

The housing 50 of the drop terminal 38 includes a length L and a width W. The length L is parallel to the central longitudinal axis 60 of the housing 50. In the subject embodiment, first, second and third rows $70_1$-$70_3$ of the ruggedized fiber optic adapters 52 are mounted to the front piece 66 of the housing 50. In the depicted embodiment, each of the first, second and third rows $70_1$-$70_3$ includes four ruggedized fiber optic adapters 52 spaced-apart across the width W of the housing 50. It will be understood, however, that the scope of the present disclosure is not limited to the housing 50 of the drop terminal 38 having first, second and third rows $70_1$-$70_3$ or to the housing 50 having four ruggedized fiber optic adapters 52 per row.

In the subject embodiment, the first row $70_1$ is located closest the first end 62 of the housing 50, the third row $70_3$ is located closest the second end 64 of the housing 50 and the second row $70_2$ is located between the first and third rows $70_1$, $70_3$. The front face of the front piece 66 has a stepped configuration with three steps $72_1$-$72_3$ positioned consecutively along the length L of the housing 50. Each step $72_1$-$72_3$ includes an adapter mounting wall $74_1$-$74_3$ defining adapter mounting openings in which the ruggedized fiber optic adapters 52 are mounted. A sealing member is compressed between a main housing of the ruggedized fiber optic adapter 52 and the adapter mounting wall $74_1$-$74_3$ to provide an environmental seal about the adapter mounting opening.

As shown at FIG. 6, the adapter mounting walls $74_1$-$74_3$ are generally parallel to one another and are spaced apart along the length L of the housing 50. The adapter mounting walls $74_1$-$74_3$ have front faces that are aligned at an oblique angle $\theta_1$ relative to a plane P that extends through the central longitudinal axis 60 and across the width W of the housing 50. The angled configuration of the adapter mounting walls 74 causes the ruggedized fiber optic adapters 52 to be angled relative to the plane P. For example, center axes 76 of the ruggedized fiber optic adapters 52 are shown aligned at an oblique angle $\theta_2$ relative to the plane.

Figure 7:
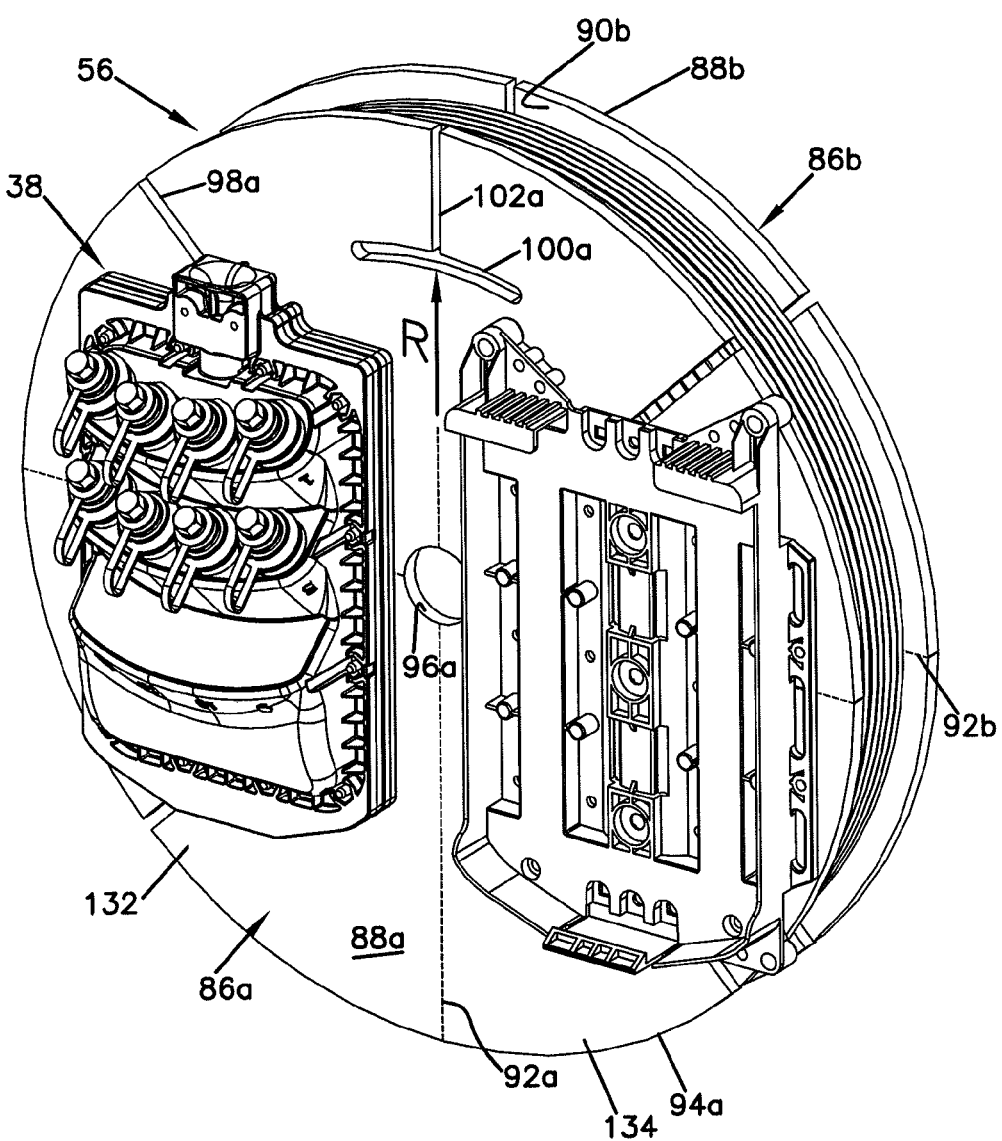
FIG. 7 is an isometric view of the drop terminal engaged to a first cable spool.
Figure 8:
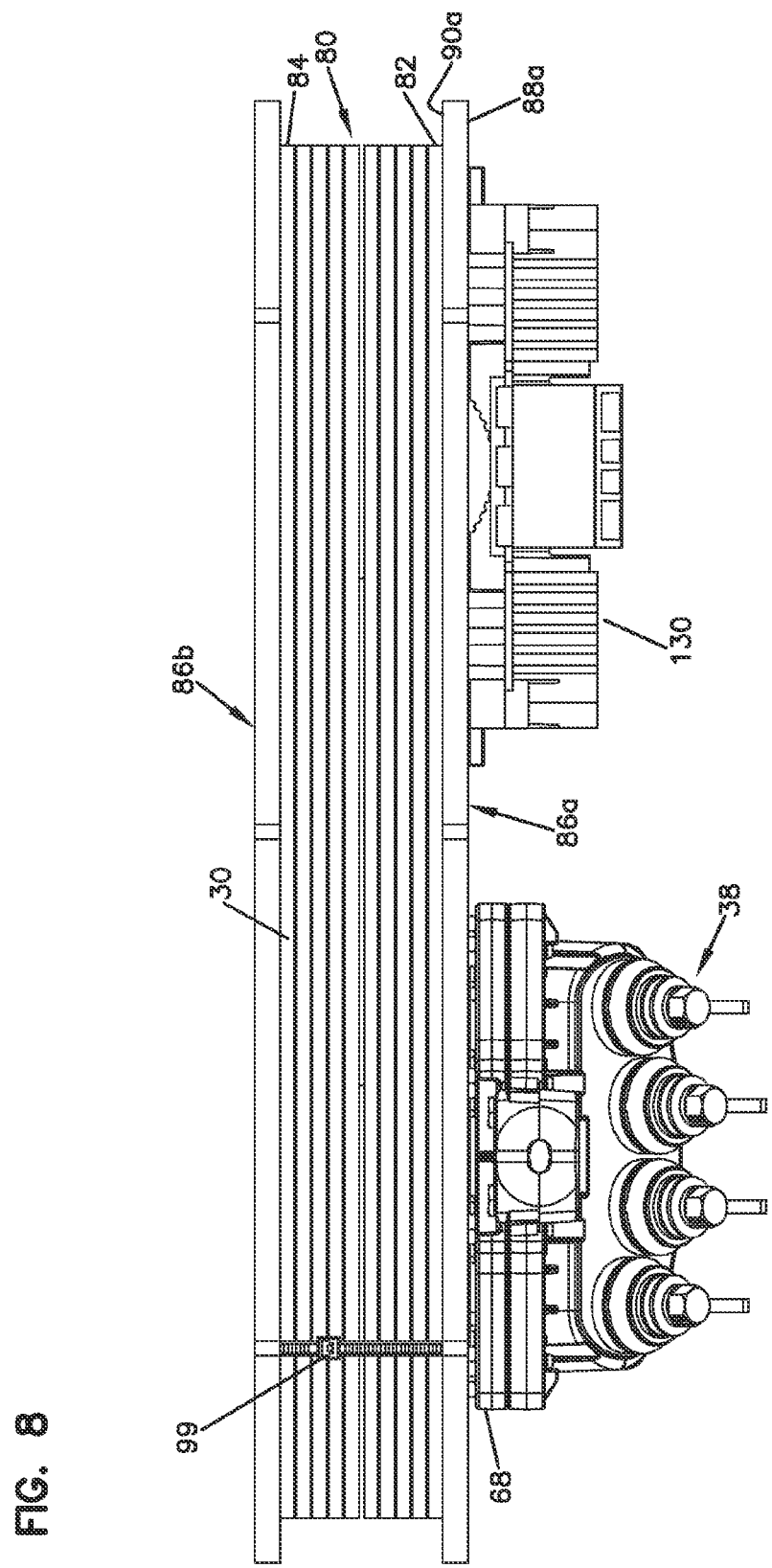
FIG. 8 is a side view of the drop terminal and first cable spool of FIG. 7.

Referring now to FIGS. 7 and 8, the first cable spool 56 is shown. The first cable spool 56 includes a spooling portion 80 having a first axial end 82 and an oppositely disposed second axial end 84. A first length of the F2 distribution cable 30 is coiled about the spooling portion 80 of the first cable spool 56. In one embodiment, the first length is less than or equal to about 200 meters of cable.

The first cable spool 56 further includes a first flange 86a and a second flange 86b. The first flange 86a is engaged to the first axial end 82 of the spooling portion 80 while the second flange 86b is engaged to the second axial end 84 of the spooling portion 80. In the depicted embodiment, the first and second flanges 86a, 86b are structurally similar. Therefore, for ease of description purposes, the first flange 86a will be described. Features of the second flange 86b will include the same reference numeral as the corresponding feature of the first flange 86a except that the reference numeral associated with the feature of the second flange will include a "b" following the numeral instead of an "a." It will be understood, however, that the first and second flanges 86a, 86b do not need to be similar.

In the depicted embodiment, the first flange 86a is generally circular in shape. In other embodiments, the first flange 86a can have other geometric shapes (e.g., rectangular, square, triangular, etc.).

The first flange 86a includes a first surface 88a and an oppositely disposed second surface 90a. The first surface 88a is engaged to an exterior surface of the back piece 68 of the drop terminal 38 while the second surface 90a of the first flange 86a is engaged with the spooling portion 80. In the subject embodiment, the first flange 86a is engaged to the drop terminal 38 by an adhesive. In another embodiment, the first flange 86a is engaged to the drop terminal 38 by a mechanical fastener (e.g., tie, staple, tack, screw, bolt, etc.). In the subject embodiment, the first flange 86a is engaged to the spooling portion 80 by adhesive. In another embodiment, the first flange 86a is engaged to the spooling portion 80 by a mechanical fastener (e.g., staple, tack, screw, bolt, etc.).

In the depicted embodiment of FIG. 7, the first flange 86 includes an area of weakness 92a. The area of weakness 92a is adapted to provide a location at which the first flange 86a can be removed from the first cable spool 56 by cutting or tearing. In one embodiment, the area of weakness 92a is an area of reduced thickness. In another embodiment, the area of weakness 92a is series of slits or perforations that extend through the first and second surfaces 88a, 90a of the first flange 86a.

The area of weakness 92a extends radially inward from an outer perimeter 94a of the first flange 86a. In the depicted embodiment, the area of weakness 92a extends from the outer perimeter 94a to an inner diameter 96a. In one embodiment, the area of weakness 92a may include a slit disposed at the outer perimeter 94a of the first flange 86a. The slit at the outer perimeter 94a of the first flange 86a can serve as a point at which tearing can be initiated.

In one embodiment, and by way of example only, there are three areas of weakness 92a that extend from the outer perimeter 94a to the inner diameter 96a.

The three areas of weakness 92a are disposed on the first flange 86a so that one of the areas of weakness 92a is about 90 degrees from at least one of the other areas of weakness 92a.

The first flange 86a includes a plurality of slots 98a that extend through the first and second surfaces 88a, 90a of the first flange 86a. The slots 98a extend radially inward from the outer perimeter 94a of the first flange 86a to a radial location. In one embodiment, the radial location is about equal to a radius of the spooling portion 80 of the first cable spool 56.

In the depicted embodiment, the first flange 86a includes four slots 98a. Each of the slots 98a is disposed 90 degrees from the immediately adjacent slots 98a.

A fiber passage 100a extends through the first and second surfaces 88a, 90a of the first flange 86a. In the depicted embodiment, the fiber passage 100a serves as a location at which the F2 distribution cable 30 can pass from the spooling portion 80 to the first surface 88a of the first flange 86a.

In the depicted embodiment, the fiber passage 100a has a generally arcuate shape and includes a radius R. In one embodiment, the radius R is about equal to the radius of the spooling portion 80. In another embodiment, the radius R is greater than or equal to the radius of the spooling portion 80.

A cable slot 102a extends from the outer perimeter 94a to the fiber passage 100a. The cable slot 102a extends through the first and second surfaces 88a, 90a.

The second flange 86b includes a first surface 88b and an oppositely disposed second surface 90b. The second surface 90b is engaged with the second axial end 84 of the spooling portion 80.

Referring now to FIGS. 2, 3, 7 and 8, the second cable spool 58 is engaged to the first surface 88b of the second flange 86b of the first cable spool 56. The second cable spool 58 includes a drum portion 104 having a first axial end 106 and an oppositely disposed second axial end 108. A second length of the F2 distribution cable 30 is coiled about the drum portion 104 of the second cable spool 58. In one embodiment, the second length is less than or equal to about 500 meters of cable. In another embodiment, the second length is in a range of about 200 meters to about 500 meters.

The second cable spool 58 further includes a first flange 110 and a second flange 112. The first flange 110 is engaged to the first axial end 106 of the drum portion 104 while the second flange 112 is engaged to the second axial end 108 of the drum portion 104.

In the depicted embodiment, the first and second flanges 110, 112 are generally rectangular in shape. In other embodiments, the first and second flanges 110, 112 can have other geometric shapes (e.g., circular, triangular, etc.).

The first flange 110 includes a first surface 114 and an oppositely disposed second surface 116. The first surface 114 is engaged to the second surface 90b of the second flange 86b of the first cable spool 56 while the second surface 116 of the first flange 110 is engaged with the first axial end 106 of the drum portion 104. In the subject embodiment, the first flange 110 is engaged to the second flange 86b of the second cable spool 56 by adhesive. In another embodiment, the first flange 110 of the second cable spool 58 is engaged to the second flange 86b of the second cable spool 56 by mechanical fasteners (e.g., staples, tacks, screws, bolts, etc.).

The second surface 116 of the first flange 110 is engaged to the first axial end 106 of the drum portion 104. In one embodiment, the first flange 110 is engaged to the drum portion 104 by adhesive. In another embodiment, the first flange 110 of the second cable spool 58 is engaged to the drum portion 104 by mechanical fasteners (e.g., staples, tacks, screws, bolts, etc.).

The first flange 110 defines a cable passage 120 that extends radially inward from an outer edge 122 of the first flange 110. The cable passage 120 extends through the first and second surfaces 114, 116. The cable passage 120 is aligned with the cable slot 102b of the second flange 86b of the first cable spool 56. The cable passage 120 and the cable slot 102b are adapted to provide a location at which cable disposed about the spooling portion 80 of the first cable spool 56 can pass to the drum portion 104 of the second cable spool 58.

The second flange 112 includes a first surface 124 and an oppositely disposed second surface 126. The second surface 126 of the second flange 112 is engaged to the second axial end 108 of the drum portion 104. In the depicted embodiment, the thickness of the second flange 112 is greater than or equal to the thickness of the first flange 110 of the second cable spool 58.

The first and second cable spools 56, 58 are adapted for disposal. In one embodiment, the first and second cable spools 56, 58 are made of a paperboard material (e.g., cardboard, etc.). In another embodiment, the first and second cable spools 56, 58 are made of a corrugated paperboard material (e.g., corrugated cardboard, etc.).

In one embodiment, the drop terminal assembly 54 further includes a mounting bracket 130 for mounting the drop terminal 38 to a structure (e.g., hand hole 42). An exemplary mounting bracket that is suitable for use as the mounting bracket 130 has been described in U.S. Pat. No. 7,477,824, which is hereby incorporated by reference in its entirety.

In the depicted embodiment, the mounting bracket 130 is engaged to the first surface 88a of the first flange 86a of the first cable spool 56. In one embodiment, the mounting bracket 130 is engaged to the first flange 86a by an adhesive. In another embodiment, the mounting bracket 130 is engaged to the first flange 86a by a mechanical fastener (e.g., tie, staple, tack, screw, bolt, etc.).

In the depicted embodiment, the mounting bracket 130 is mounted to the first flange 86a of the first cable spool 56 at a location that is adjacent to the location at which the drop terminal 38 is mounted. In the depicted embodiment, the drop terminal 38 is mounted in a first portion 132 of the first flange 86a while the mounting bracket 130 is mounted in a second portion 134 of the first flange 86a. In one embodiment, the first portion 132 is a first half of the first flange 86a while the second portion 134 is a second half of the first flange 86a.

Figure 9:
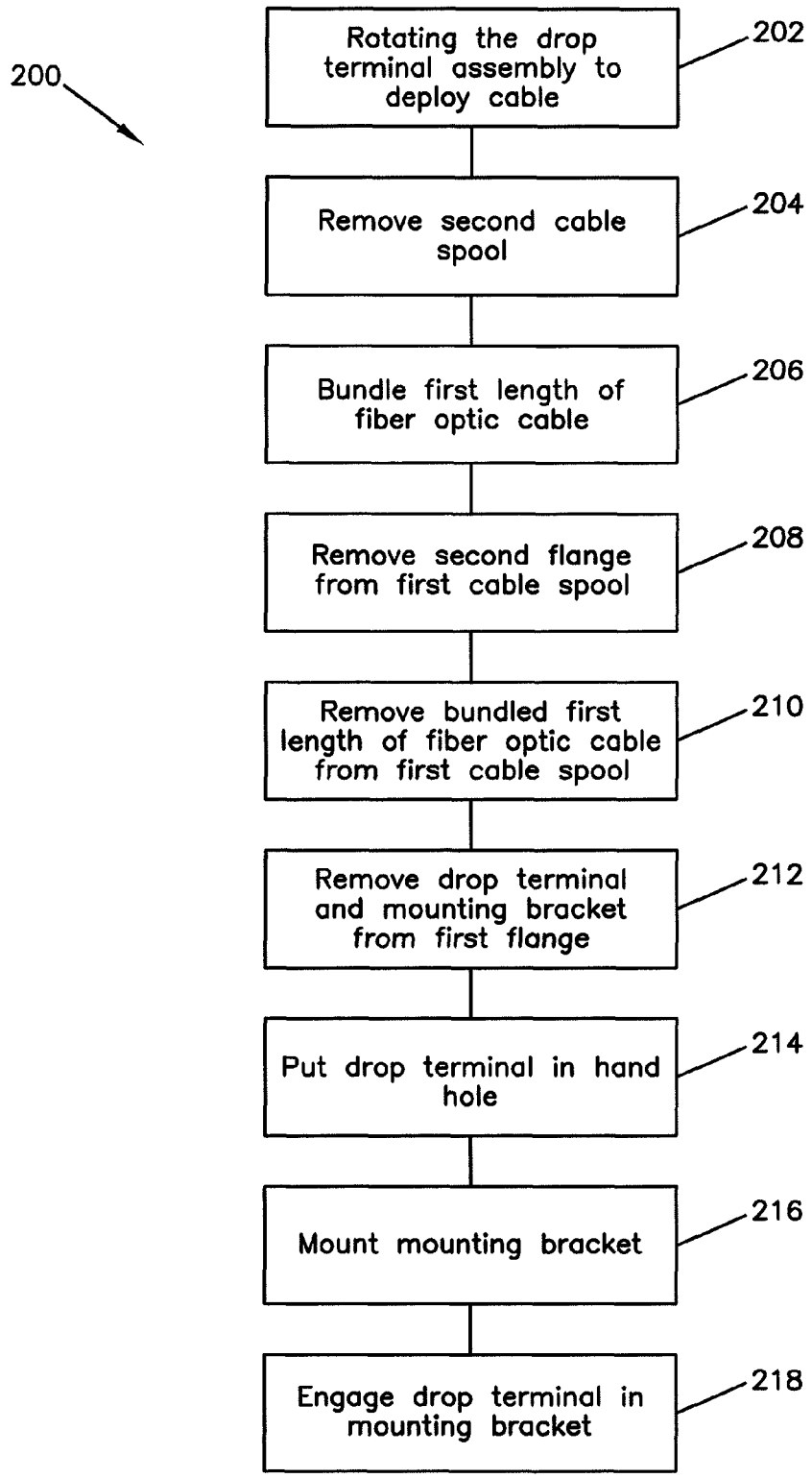
FIG. 9 is a representation of a method for installing a drop terminal.

Referring now to FIGS. 1, 2 and 9, a method 200 for installing the drop terminal 38 will be described. With the drop terminal 38 engaged to the first cable spool 56 and the first spool 56 engaged to the second cable spool 58, the drop terminal 38, the first cable spool 56 and the second cable spool 58 are rotated in unison to deploy the second length of F2 distribution cable 30 from the second cable spool 58 in step 202. As previously provided, the second length of F2 distribution cable 30 is adapted for connection to the fiber distribution hub 28. In one embodiment, the drop terminal assembly 54 is positioned near the hand hole 42 prior to deploying the F2 distribution cable 30. In another embodiment, the drop terminal assembly 54 is initially positioned adjacent to the fiber distribution hub 28 and the F2 distribution cable 30 is deployed as the drop terminal assembly 54 is transported to the location of the hand hole 42.

With the second length of the F2 distribution cable 30 deployed, the second spool 58 is removed from the first cable spool 56 in step 204. The first length of F2 distribution cable 30 disposed about the first cable spool 56 is bundled together in step 206. In one embodiment, cable ties 99 are used to bundle the first length of F2 distribution cable 30. In one embodiment, the cable ties 99 access the first length of F2 distribution cable 30 through the slots 98*a*, 98*b* of the first and second flanges.

With the first length of F2 distribution cable 30 bundled, the second flange 86*b* is removed from the first cable spool 56 in step 208. In one embodiment, the second flange 86*b* is removed by tearing or cutting the second flange 86*b* at the areas of weakness 92*b*.

The bundled first length of F2 distribution cable 30 is removed from the spooling portion 80 by axially pulling the bundled first length off the second axial end 84 of the spooling portion 80 in step 210. In step 212, the drop terminal 38 and the mounting bracket 130 are removed from the first flange 86*a* of the first cable spool 56. The first cable spool 56 can then be disposed, reused or recycled.

The drop terminal 38, the mounting bracket 130 and the bundled first length of F2 distribution cable 30 are dropped in the hand hole 42 in step 214. The first length of F2 distribution cable 30 is adapted to provide excess cable in the event that extra cable is needed.

In one embodiment, some of the first length of F2 distribution cable 30 may be deployed with the second length of F2 distribution cable 30. In this embodiment, the remaining first length of F2 distribution cable 30 is bundled and placed in the hand hole 42 with the drop terminal 38 and the mounting bracket 130.

In step 216, the mounting bracket 130 is installed in the hand hole 42. The drop terminal 38 is engaged to the mounting bracket 130 in step 218.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A method for installing a drop terminal comprising:
   providing a drop terminal assembly including:
   a drop terminal having an exterior surface;
   a first cable spool mounted to the exterior surface of the drop terminal;
   a second cable spool mounted to the first cable spool;
   a fiber optic cable having a first length disposed about the first cable spool and a second length disposed about the second cable spool;
   rotating the drop terminal assembly to deploy the second length of fiber optic cable;
   removing the second cable spool;
   bundling the first length of fiber optic cable;
   removing the bundled first length of fiber optic cable from the first cable spool;
   removing the drop terminal from the first cable spool; and
   mounting the drop terminal to a structure.

2. A telecommunications system deployment device comprising:
   a first spool;
   a second spool mounted on top of the first spool;
   a drop terminal including a drop terminal housing having a front side and a back side, the front side including a plurality of fiber optic adapter ports accessible from outside the drop terminal housing, the drop terminal being secured to a top end face of the second spool;
   a mounting bracket for mounting the drop terminal to another structure, the mounting bracket being configured to mount to the back side of the drop terminal housing, the mounting bracket being secured to the top end face of the second spool, the drop terminal housing and the mounting bracket being secured in a side-by-side relationship on the top end face of the second spool; and
   a fiber optic cable connected to the drop terminal, the fiber optic cable including a first portion coiled about the first spool and a second portion coiled about the second spool.

3. The method for installing a drop terminal of claim 1, wherein the drop terminal is mounted using a mounting bracket, the drop terminal and the mounting bracket being secured in a side-by-side relationship on the first cable spool.

4. The telecommunications system deployment device of claim 2, wherein the second spool further includes a first flange and a second flange, wherein the first and second flanges include at least one slot extending radially inward from an outer perimeter of each of the first and second flanges, and wherein the slots are configured to receive a bundling device to bundle the second portion of the fiber optic cable coiled on the second spool.

* * * * *